Aug. 30, 1960
E. J. McCARTNEY
2,951,160
OBJECT DETECTION SYSTEM
Filed April 23, 1956
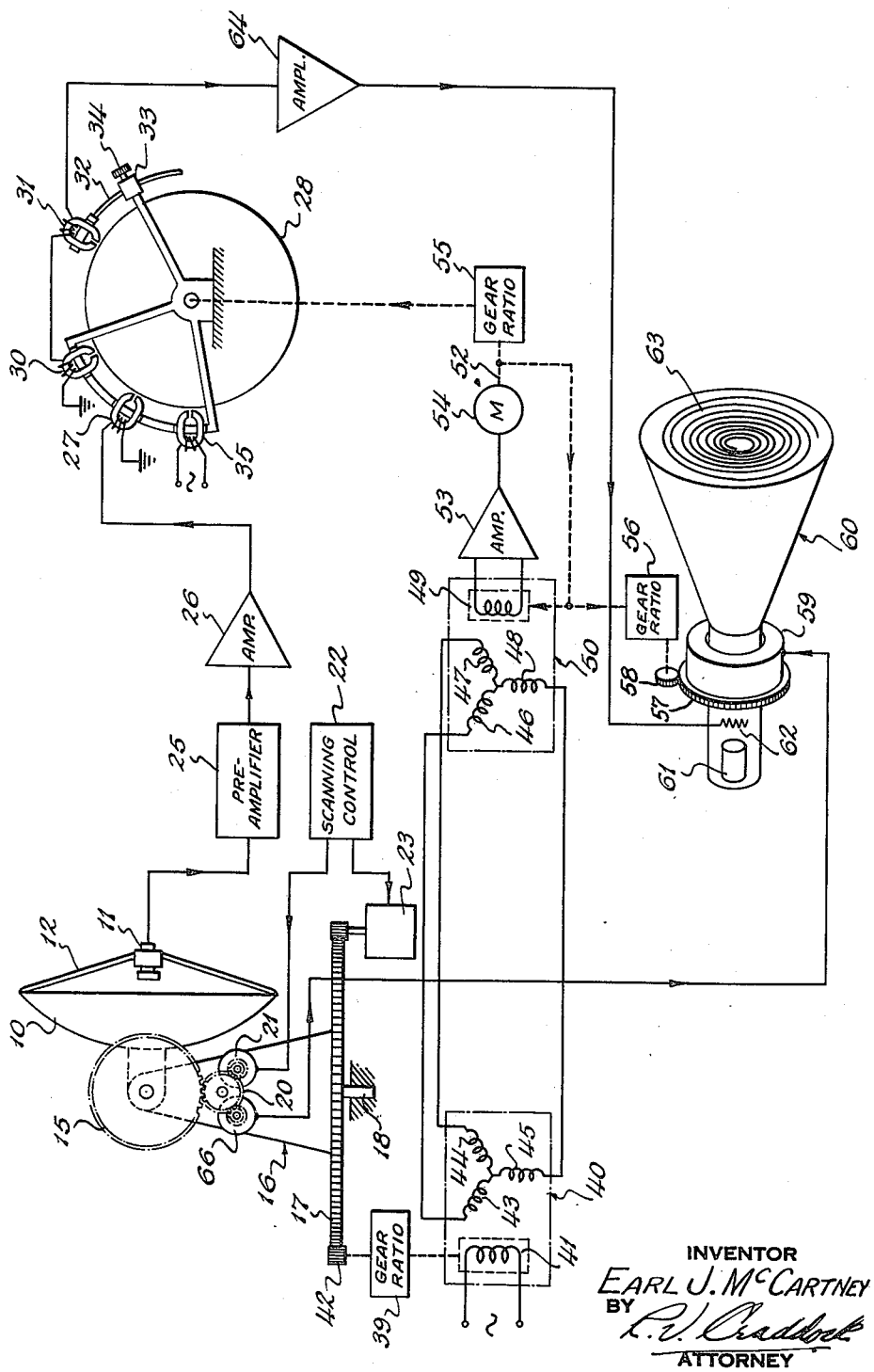
INVENTOR
EARL J. McCARTNEY
BY
ATTORNEY

2,951,160
OBJECT DETECTION SYSTEM

Earl J. McCartney, Rockville Centre, N.Y., assignor to Sperry Rand Corporation, a corporation of Delaware Filed Apr. 23, 1956, Ser. No. 580,129

11 Claims. (Cl. 250—83.3)

This invention relates to an object detection system and more particularly to such a system which utilizes a signal representing a difference with respect to a certain characteristic between two elemental scanning areas.

In infrared object detection systems, the target is seen against the background of sky, ground or water. The background radiates heat waves of wavelengths not greatly different from those radiated by the target. The detection means used in such systems is usually sensitive enough that, in the absence of a target, background radiation would produce sufficient energy at the receiver to produce a signal. The effective background radiation can be cancelled and a greater target signal can be produced by using two infrared sensitive elements or cells mounted side by side near the focal point or in the focal surface of the optical collecting system. The two cells are connected in series opposition so that the total output is a measure of the difference of radiation falling on the two cells. If background radiation falls on both cells, there is no output, but if target radiation falls on one cell and background radiation on the other, there is a signal indicative of the target.

When two adjacent sensitive cells are used, it is desirable that the distance separating them be adjustable so that this distance may be varied to give an optimum signal-to-noise ratio with varying scan speeds and varying background conditions. Moreover, if the scanning speed varies, as it would at the ends of a back-and-forth scanning pattern, the separation of the sensitive cells should be varied accordingly to maintain optimum conditions.

It is structurally difficult to provide a double-area sensitive cell, especially if the separation is arranged to be varied in use. Furthermore, in most infrared systems, the additional space required by two cells as well as their separation-varying mechanism would diminish the light collected by the optical system. Some infrared cells are refrigerated to obtain the higher sensitivity. The use of one cell in place of two is highly desirable in this situation since it greatly simplifies the problems of refrigeration.

It is therefore an object of this invention to provide an object detection system in which the output of one receiving means is used to obtain a differential output signal.

It is a further object of this invention to provide an object detection system in which a signal is provided representing a difference in a certain characteristic of two separate scanned elements and in which said separation can be varied readily.

It is a further object of this invention to provide an infrared scanning system in which a signal is provided representative of the difference in radiation of two proximate scanned elements and in which the effective separation between said scanned elements is varied in accordance with variations in scanning speed.

It is also an object of this invention to provide an infrared object detection system in which a signal representative of the difference in radiation between proximate areas is obtained with the use of only one sensitive cell.

Other objects and advantages will be apparent to those skilled in the art from a consideration of the following specification taken in consideration with the accompanying drawing which is a block diagram of an infrared object detection system utilizing the principles of this invention.

The objects of this invention are achieved by a system in which a single sensitive cell is caused to effectively scan successive elemental portions of a scanned area. The output of the cell is delayed and the signal used in the display or other utilizing component is the difference between the delayed output of the cell and the substantially undelayed output.

As seen in the drawing, a parabolic reflector 10 has at its focal point, a cell 11, which is sensitive to infrared radiation. Cell 11 is supported by a spider 12 extending between the cell 11 and the reflector 10. Reflector 10 is fixed to a gear wheel 15 which is journalled on a horizontal axis in pedestal 16. Pedestal 16 is fixed to large gear wheel 17 which is journalled at 18 to turn on a fixed vertical axis. Gear wheel 15 is turned about its horizontal axis through idler gear 20 by motor 21 which is controlled by scanning control component 22. Large gear wheel 17 is turned about its horizontal axis by motor 23 which is also controlled by scanning control component 22.

The output of cell 11 is connected through preamplifier 25 and then through amplifier 26 to magnetic recording head 27. Preferably, preamplifier 25 would be mounted in fixed relation with reflector 10 and the connection between preamplifier 25 and amplifier 26 would be through a slip-ring arrangement not shown. Magnetic recording head 27 is associated with a magnetic recording medium which may be a magnetizable drum 28 or a loop of magnetic tape.

Also associated with magnetic recording medium 28 are two magnetic pickup heads 30 and 31 which are connected in series opposition and to amplifier 64. The positions of recording head 27 and pickup head 30 are fixed as by permanent attachment to the frame on which the drum 28 is pivoted. The position of pickup head 31 is variable so that it may be moved along the periphery of drum 28 toward or away from the pickup head 30. Pickup head 31 could be supported by curved arm 32 which passes through a socket 33 fixed with respect to the axis of drum 28. The position of pickup head 31 is temporarily fixed by the set screw 34. There is also provided an erasing head 35 supplied by a source of alternating current. The heads 27, 30 and 31 and 35 are all effectively aligned in a plane perpendicular axially to the drum 28.

A synchro 40 has a rotatable coil 41 supplied with alternating current and rotated through gear ratio 39 by a pinion 42 meshed with large gear wheel 17. The three Y-connected stator coils 43, 44, 45 of the synchro 40 are correspondingly connected to stator coils 46, 47 and 48 of synchro 50. The rotatable coil 49 of synchro 50 is electrically connected to amplifier 53, the output of which is connected to motor 54. Motor 54 rotates shaft 52 in synchronism with the rotation of pedestal 16 about its vertical axis. Shaft 52 is directly connected to rotate rotor coil 49 which rotates drum 28 through gear ratio 55.

Shaft 52 also, through gear ratio 56, gear 57 and pinion 58, rotates deflection yoke 59 of cathode ray tube 60 in synchronism with the rotation of pedestal 16 about its vertical axis. Gear ratio 56 is necessary because of the difference in diameter between gear 57 and pinion 58. Cathode ray tube 60 also has an electron gun 61, control grid 62 and indicating screen 63. Pickup heads 30 and 31 are connected in series opposition and are connected to the input of amplifier 64. The output of amplifier 64 is connected to the control grid 62 of cathode ray tube 60. A potentiometer 66, rotated by idler gear 20 supplies to deflection yoke 59 of cathode ray tube 60 a voltage indicative of the angular position of parabola 10 about its horizontal axis.

In the operation of the system shown in the drawing, the scanning control 22 normally provides a steady voltage to motor 23 to turn gear wheel 17 and pedestal 16 at a constant relatively rapid rate of speed in one direction and in the order of magnitude of one revolution per second. At the same time the scanning control 22 supplies elevation motor 21 with a voltage that varies relatively slowly in simple harmonic or sawtooth fashion from plus to minus so that motor 21 through idler gear 20 rocks gear 15 from one side to the other. This rocks reflector 10 back and forth while it is rotating so that it scans a section of the sky with a spiral scanning pattern. The period of oscillation of the parabola may be in the order of magnitude of one minute.

As the gear 17 turns on its vertical axis, it correspondingly turns gear 42, which through gear ratio 39, turns moving coil 41 of synchro 40 so that coil 41 is always aligned rotationally with gear 17. Stationary coils 43, 44 and 45 of synchro 40 transmit a three-phase current indicative of the rotational direction of coil 41 to stationary coils 46, 47, 48 of synchro 50. Movable coil 51 of synchro 50 picks up an error signal when it is not aligned rotationally with movable coil 41 of synchro 40. The error signal produced by coil 51 is amplified in amplifier 53 and used to position motor 54 which in turn rotates coil 51 to a null position through shaft 52. Motor 54 also drives drum 28 through gear ratio 55 at a speed proportional to the rotational speed of gear 17 and pedestal 16 about the vertical axis.

The gear ratio 55 might be selected to give proper frequency response by heads 30 and 31 when pedestal 16 is rotating at its lowest velocity.

Electron gun 61 in cathode ray tube 60 generates a stream of electrons which is focused upon the screen 63 and, when intensified by control grid 62, makes a visible trace upon the screen 63.

Potentiometer 66 supplies a voltage to yoke 59 which deflects the electron beam of tube 60 radially in a manner representative of the angular position of the optical axis of parabola 10 about its horizontal axis. Shaft 52 mechanically rotates yoke 59 to deflect the electron beam circumferentially in a manner representative of the angular position of pedestal 16 about its vertical axis. The parabola 10 thus scans the hemisphere above it in a spiral scan which is represented on the screen 63 as a substantially flat spiral showing the areas that are cooler and hotter than the background of sky as visible areas on the screen 63.

Infrared radiation from the area being scanned is collected by the reflector 10 and concentrated upon infrared sensitive cell 11. The output of cell 11 has an amplitude indicative of the amount of infrared radiation falling thereon. Generally, whether or not there is a target, there will be some radiation falling on the cell 11 to provide an output which is amplified by components 25 and 26 and applied to recording head 27. Recording head 27 magnetizes the drum 28 in accordance with the amplitude of the signal provided by cell 11.

As the parabola 10 is rotated about its vertical axis and rocked about its horizontal axis, it scans a succession of elemental areas in space and the signals representative of these elemental areas are stored in succession of the drum 28. As these signals pass under the pickup heads 30 and 31, at any instant, the pickup head 31 is picking up a signal from one elemental area while the pickup 30 is providing a signal representative of an area scanned a slight period in time later. If the radiation received from these elemental areas is the same, there will be no output from pickup heads 30 and 31, since they are connected in opposition, there will be no signal applied to the grid 62 of cathode ray tube 60 and no visible trace will appear upon screen 63. However, if a target is encountered, which is cooler or hotter than the background, then at the point where the cell 11 has crossed from background to target, there will be a difference in pickup from the heads 30 and 31, giving an output signal which is amplified in component 64 and applied to grid 62 to provide a visible trace on screen 63.

Erasing head 35 erases the magnetic variation representative of the signal so that, at a point preceding pickup head 27, the drum periphery is again ready to receive a new signal indicative of the instantaneous received radiation.

The distance between heads 30 and 31 is adjusted by means of the arm 32 and set screw 34 to provide an optimum signal under present conditions. If the rotational speed of the parabola 10 about its vertical axis varies, the speed of the drum 28 correspondingly varies so that the effective separation between the heads 30 and 31 tends to remain the same.

It will be understood that other delay means such as an artificial line or an acoustic delay line could be substituted for the delay provided by the recording means 28, 27, 30 and 31 and 35. The amount of delay provided by such other delay lines could be varied as by shifting taps in accordance with the velocity of shaft 52.

The magnetic recording device shown in the drawing has one particular advantage in that the signal provided at the pickup heads 30 and 31 is a derivative of the signal provided by the infrared sensitive cell 11, thus intensifying and exaggerating differences in received radiation, a desirable feature in showing weak signals.

It will be understood that the system for providing a differential signal with only one pickup device may be applied to any object detection device such as those operating with visible light, radio waves, or sound waves. It will further be understood that any type of scanning may be employed with this system as long as the signal applied to the recording head 27 is representative of a succession of elemental scanned areas. For instance, both scanning motions could be oscillatory. The pickup cell corresponding to cell 11 could be omni-directional while a directional search beam of infrared radiation could be used to scan the area. It would also be possible to record a differential signal on the drum 28 by two, spaced recording heads, connected in opposition to the amplifier 26, thus picking up the differential signal by one pickup head.

It will be seen that as the optical axis of the parabola 12 in the drawing approaches the zenith, or pole of symmetry, with a constant angular motion about the horizontal axis, the effective scan speed (or sweep speed of the line of sight across elemental areas) decreases and so does the signal frequency while the duration of an echo signal from an elemental target area increases. If the speed of drum 28 is maintained constant and in synchronism with the speed of rotation of parabola 12 about its vertical axis, then the length of an elemental echo as recorded on drum 28 will be elongated in accordance with the increased duration of the echo due to the slower effective scanning speed. Then, to maintain the same spatial separation between elemental echoes being compared, the distance between the pick-up heads 30 and 31 should be increased as the optical axis of parabola 10 approaches the zenith. This could easily be done automatically by moving the pick-up head 31 away from the head 30 as the optical axis approaches the zenith and toward the head 30 as the optical axis moves away from the zenith. A cam fixed to gear wheel 15 could move vertically a rod mounted concentrically with the vertical axis of pedestal 16. The end of said rod could be mechanically connected to the arm 32 supporting pick-up head 31.

It is advantageous to maintain the signal frequency and duration of elemental echoes constant throughout the scanning pattern. This may be accomplished by varying the scanning motion about the vertical axis in direct proportion to the secant of the elevation angle of the optical axis of parabola 10 as explained in my copending application Serial No. 460,295, filed October 5, 1954, for Servo Control System.

If the azimuthal scanning speed is increased in proportion of the secant of elevation scanning angle, then the duration of echoes from elemental targets will remain constant. However, if the recording drum speed is synchronized with the azimuthal scanning speed so that the drum speed will be higher as the optical axis approaches the zenith and an elemental echo will be relatively elongated as recorded on drum 28. This has the effect of lessening the distance between the pick-up heads 30 and 31, an effect which can be compensated by increasing the distance between the heads 30 and 31 as the optical axis approaches its axis; as set forth above.

It will be seen that the system hereinabove disclosed provides a simple method and means for obtaining a differential signal while using only one pickup device and allows the separation of the elemental scanned areas being compared to be changed at will without stopping the scanning device.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Receiving means for producing a series of signals representative of the wave energy characteristic of a succession of elemental scanned areas the signals representative of adjacent elemental areas being separated by a predetermined period of time, a first output responsive to said receiving means, a delay means responsive to said receiving means and having a second output, said delay means being effective to delay said second output by said predetermined period with respect to said first output comparison means for producing a differential output indicative of the difference between the signals at said first and second outputs.

2. The combination of claim 1 in which there are additionally provided a display component with visible indicating means, control means for varying a characteristic of said visible indicating means, means for deflecting said visible indicating means in at least one scanning direction, means for driving said receiving means at a predetermined scanning speed, means to apply deflection energy to said deflection means to deflect said visible indicating means at a speed commensurate with said scanning speed and means to connect said comparison means to said control means.

3. Receiving means for producing a signal representative of wave energy received along an axis of sensitivity, means for scanning an area in space by moving said axis of sensitivity at a predetermined angular velocity along a scanning line of elemental areas, a first output responsive to said receiving means, a delay means responsive to said receiving means and having a second output, said delay means providing a delay period with respect to said first output equal to the time required for said axis of sensitivity to move from one elemental area to the next comparison means for producing a differential output indicative of the difference between the signals at said first and second outputs.

4. The combination of claim 3 in which means are provided for varying said delay.

5. The combination of claim 3 in which there is additionally provided a display component having visible indicating means, means for controlling a characteristic of said visible indicating means, means for deflecting said visible indicating means in at least one direction at a speed commensurate with said first means for scanning, means to connect said comparison means to said control means.

6. In an object detecting system, a cell directionally sensitive to wave energy along an axis, means for moving said axis along a scanning line, means connecting said cell to a recording head associated with a recording medium, first and second pickup heads each associated with said recording medium, means for moving said recording medium relative to said recording head and said first and second pickup heads, said first and second pickup heads being displaced along said line of relative movement and connected in opposition to produce an output signal equal to the difference of their outputs.

7. The combination of claim 6 in which there is provided a display component with visible indicating means, means for controlling a characteristic of said visible indicating means, means for deflecting said visible indicating means in at least one direction commensurate with the movement of said axis and means connecting said output signal to said control means.

8. In an object detection system, an optical system having a directional axis and a focal point, a cell sensitive to infrared radiation and situated approximately at said focal point, means for causing said directional axis to scan an area in space, a first output responsive to the output of said cell, a delay means responsive to said first output and having a second output, comparison means for producing a differential output indicative of the difference between the signals at said first and second outputs.

9. In an object detection system, an optical system having a directional axis and a focal point, a cell sensitive to infrared radiation and situated approximately at said focal point, means for causing said directional axis to scan an area in space, means connecting said cell to a recording head associated with a recording medium, a first and second pickup head, each associated with said recording medium, means for moving said recording medium relative to said recording head and said first and second pickup heads, said first and second pickups being displaced along said line of relative movement and connected in opposition to produce a differential output signal equal to the difference of their outputs.

10. The object detection system of claim 9 in which there is a cathode ray tube having a screen, means to provide an electron beam, intensity control means for said beam, means to deflect said beam to scan an area on said screen representative of said area scanned in space, and means for connecting said differential output to said control means.

11. The combination of claim 3 in which said delay means includes a moving recording medium associated with a recording head and first and second pickup heads, means for driving said recording medium at a speed proportional to the rotational speed of said receiving means about its vertical axis, said recording head being connected to said receiving means and said first and second pickup heads being respectively connected to said first and second outputs.

References Cited in the file of this patent

UNITED STATES PATENTS

| | | |
|---|---|---|
| 2,392,873 | Zahl | Jan. 15, 1946 |
| 2,410,424 | Brown | Nov. 5, 1946 |
| 2,532,546 | Forbes | Dec. 5, 1950 |
| 2,566,189 | Gloess | Aug. 28, 1951 |
| 2,597,636 | Hall et al. | May 20, 1952 |
| 2,721,275 | Jackson | Oct. 18, 1955 |
| 2,793,345 | Hags | May 21, 1957 |